United States Patent
Sato et al.

(10) Patent No.: US 7,330,879 B2
(45) Date of Patent: Feb. 12, 2008

(54) PRINTING SYSTEM AND METHOD

(75) Inventors: Hideaki Sato, Tokyo (JP); Shigeru Nagai, Tokyo (JP); Nobumasa Notake, Tokyo (JP)

(73) Assignee: Office24 Co., Ltd., Tokyo (JP)

( * ) Notice: Subject to any disclaimer, the term of this patent is extended or adjusted under 35 U.S.C. 154(b) by 898 days.

(21) Appl. No.: 10/647,480

(22) Filed: Aug. 26, 2003

(65) Prior Publication Data
US 2005/0066054 A1 Mar. 24, 2005

(51) Int. Cl.
G06F 15/16 (2006.01)
G06F 15/173 (2006.01)

(52) U.S. Cl. ............... 709/217; 709/203; 709/218; 709/225; 709/229

(58) Field of Classification Search ........... 709/206, 709/220, 223–226, 245, 203, 217–219, 229; 348/207.2
See application file for complete search history.

(56) References Cited

U.S. PATENT DOCUMENTS 6,157,950 A * 12/2000 Krishnan ............... 709/245
6,993,562 B2 * 1/2006 Treptow et al. .......... 709/206
2003/0025796 A1 * 2/2003 Yamagishi ............. 348/207.2
2003/0041140 A1 * 2/2003 Matsumoto ............ 709/220
2003/0177220 A1 * 9/2003 Ohara .................... 709/223
2003/0231331 A1 * 12/2003 Tanaka ................... 358/1.13
2004/0073574 A1 * 4/2004 Shimizu et al. ......... 707/104.1

* cited by examiner

*Primary Examiner*—Quang N. Nguyen
(74) *Attorney, Agent, or Firm*—Wenderoth, Lind & Ponack, L.L.P.

(57) ABSTRACT

To provide a printing system and method in which verification of a printed sample prepared by DTP printing, and delivery of a completed printed matter, can be performed simply and in a short period of time. The printing system includes: a computer for preparing printing information, and a gateway server connected to the computer, which are provided to a printed matter preparer; and a printing apparatus having an allocated IP address, which is provided to a printed matter customer. The gateway server of the printed matter preparer is connected to the printing apparatus of the printed matter customer via an internet. When the computer of the printed matter preparer designates the IP address allocated to the printed matter customer and issues a command for outputting the printing information, the gateway server, in place of the computer, issues a command for outputting the printing information via the internet to the printing apparatus of the printed matter customer, which has the allocated IP address.

6 Claims, 6 Drawing Sheets

PRINTING SYSTEM AND METHOD

BACKGROUND OF THE INVENTION

1. Field of the Invention

The present invention relates to a printing system and method, and more particularly, to a printing system and method in which verification of a printed sample, which is prepared by desk top publishing (DTP) after an order for a printed matter is received from a printed matter customer, and delivery of the completed printed matter can be performed simply and in a short period of time.

2. Description of the Related Art

Printing by desktop publishing (DTP), whereby printed matters of various types are prepared by utilizing a computer, has been spreading in recent years. Even in the publishing world, the preparation and delivery of the printed matters ordered by customers are more and more often being performed by DTP.

Conventionally, a printed matter customer who orders a printed matter will go through the following process when a generally performed printing system is employed. The customer will go and meet with a printed matter preparer from the time of the order up through preparation of the printed matter, verification of samples, and delivery of a completed printed matter. Alternatively, the printed matter preparer will visit the customer, or the samples or completed printed matter will be delivered by post. Even for cases where a printed matter is prepared by DTP printing utilizing a computer, the printed matter will be delivered after passing through a process like that described above.

The verification of the printed matter samples by the printed matter customer, and the delivery of the completed printed matter, in accordance with a printing system like that described above, require time and effort because the printed matter customer meets directly with the printed matter preparer, or the printed matter preparer sends the samples or the completed printed matter by post or the like. Moreover, there is a problem in that an additional amount of time and effort results when corrections are necessary after viewing the samples.

In order to eliminate the time and effort required in verifying the printed matter samples and delivering the completed printed matter, a process has been proposed in which printing information prepared by DTP printing is sent to the printed matter customer by electronic mail and is output to a printer of the printed matter customer, and then the printed matter preparer has the samples verified by the printed matter customer or delivers the output printed matter as a finished product. In this case the same hardware, such as a personal computer, and software as that used by the printed matter preparer also has to be provided to the printed matter customer. There are problems relating to the burden of investing in this equipment, and to the necessity of mastering operation of the personal computer.

SUMMARY OF THE INVENTION

An object of the present invention is to provide a printing system and method in which verification of a printed sample prepared by DTP printing and delivery of a completed printed matter can be performed simply and in a short period of time.

In order to achieve the aforementioned object, a printing system according to a first aspect of the present invention includes: a computer for preparing printing information; a gateway server connected to the computer; the computer and the gateway server being provided to a printed matter preparer; and a printing apparatus having an allocated IP address, which is provided to a printed matter customer. The gateway server of the printed matter preparer is connected to the printing apparatus of the printed matter customer via an internet. In the printing system, when the computer of the printed matter preparer designates the IP address allocated to the printing apparatus of the printed matter customer and issues a command for outputting the printing information, the gateway server, in place of the computer of the printed matter preparer, issues a command for outputting the printing information via the internet to the printing apparatus of the printed matter customer, which has the allocated IP address.

According to the printing system of the first aspect of the invention, by operating the computer of the printed matter preparer to cause the gateway server to operate, the printing information prepared by the computer of the printed matter preparer can be output via the internet from the printing apparatus of the printed matter customer, after location information for the printing apparatus is determined by identifying the IP address of the printing apparatus. Therefore, by providing the same conditions to the printing apparatus of the printed matter customer as those existing in a printing apparatus of the printed matter preparer, the printing information output obtained from the printing apparatus of the printed matter customer can be the same as a printed matter sample, or a completed printed matter, which is obtained by printing the printing information prepared by the computer of the printed matter preparer on the printing apparatus of the printed matter preparer.

A printing system according to a second aspect of the present invention includes: a computer for preparing printing information, which is provided to a printed matter preparer; a printing apparatus having an allocated IP address, which is provided to a printed matter customer; and a gateway server provided to a transmission management center. The gateway server is connected to the computer of the printed matter preparer and the printing apparatus via an internet. In the printing system, when the computer of the printed matter preparer designates the IP address allocated to the printing apparatus of the printed matter customer and issues a command for outputting the printing information via the internet, the gateway server, in place of the computer the printed matter preparer, issues a command for outputting the printing information via the internet to the printing apparatus of the printed matter customer, which has the allocated IP address.

According to the printing system of the second aspect of the invention, by operating the computer of the printed matter preparer to cause the gateway server of the transmission management center to operate, the printing information prepared by the computer of the printed matter preparer can be output via the internet from the printing apparatus of the printed matter customer after location information for the printing apparatus is determined by identifying the IP address of the printing apparatus. The computer of the printed matter preparer and the gateway server of the transmission management center are connected via the internet, and the gateway server of the transmission management center and the printing apparatus of the printed matter customer are connected via the internet. Therefore, by providing the same conditions to the printing apparatus of the printed matter customer as those existing in a printing apparatus of the printed matter preparer, the printing information output obtained from the printing apparatus of the printed matter customer can be the same as a printed matter sample, or a completed printed matter, which is obtained by printing the printing information prepared by the computer of the printed matter preparer on the printing apparatus of the printed matter preparer.

A printing system according to a third aspect of the present invention includes: a computer for preparing printing information, which is provided to a printed matter preparer; a printing apparatus having an allocated IP address, which is provided to a printed matter customer; a computer; and a gateway server. The computer and the gateway server are provided to a transmission management center. The computer and the gateway server are connected to each other. The computer of the printed matter preparer is connected to the computer of the transmission management center via an internet. The gateway server of the transmission management center is connected to the printing apparatus of the printed matter customer via the internet. In the printing system, when the IP address allocated to the printing apparatus of the printed matter customer is designated by the computer of the printed matter preparer via the internet, and the printing information is transmitted to the computer of the transmission management center, the computer of the transmission management center issues a command for outputting the printing information, and the gateway server, after receiving the command for outputting the printing information, issues a command for outputting the printing information via the internet to the printing apparatus of the printed matter customer, which has the allocated IP address.

According to the printing system of the third aspect of the invention, when the printing information prepared by the computer of the printed matter preparer is transmitted via the internet to the computer of the transmission management center along with the IP address of the printing apparatus of the printed matter customer, the computer of the transmission management center issues a command for outputting the printing information. The gateway server, after receiving the command for outputting the printing information, can output the printing information prepared by the computer of the printed matter preparer, via the internet, from the printing apparatus of the printed matter customer after location information for the printing apparatus is determined by identifying the IP address. Therefore, by providing the same conditions to the printing apparatus of the printed matter customer as those existing in a printing apparatus of the printed matter preparer, the printing information output obtained from the printing apparatus of the printed matter customer can be the same as a printed matter sample, or a completed printed matter, which is obtained by printing the printing information prepared by the computer of the printed matter preparer on the printing apparatus of the printed matter preparer.

A printing system according to a fourth aspect of the present invention, in the first aspect of the invention, includes: a memory storing means for storing printing information prepared by the computer of the printed matter preparer, which is provided to the gateway server; and a computer having an allocated IP address, which is provided to the printed matter customer. The gateway server of the printed matter preparer is connected to the printing apparatus and the computer of the printed matter customer via an internet. In the printing system, when the computer of the printed matter customer designates an IP address allocated to the self computer and issues a command for outputting the printing information via the internet to the gateway server, the gateway server issues a command for outputting the printing information stored in the memory storing means to the printing apparatus of the printed matter customer, which has the allocated IP address, via the internet.

According to the printing system of the fourth aspect of the invention, the printing information prepared by the computer of the printed matter preparer can be stored in the memory storing means of the gateway server. By designating the IP address that has been allocated to the computer of the printed matter customer, and issuing a command for outputting the printing information to the gateway server via the internet, through operating the computer of the printed matter customer, the printing information that is stored in the memory storing means of the gateway server can be output via the internet from the printing apparatus of the printed matter customer after location information for the printing apparatus is determined by identifying the IP address of the computer of the printed matter customer. Therefore, by providing the same conditions to the printing apparatus of the printed matter customer as those existing in a printing apparatus of the printed matter preparer, the printing information output obtained from the printing apparatus of the printed matter customer can be the same as a printed matter sample, or a completed printed matter, which is obtained by printing the printing information prepared by the computer of the printed matter preparer on the printing apparatus of the printed matter preparer.

A printing system according to a fifth aspect of the present invention, in the second aspect of the invention, includes: a computer having an allocated IP address, which is provided to the printer matter customer; and a memory storing means for storing printing information prepared by the computer of the printed matter preparer, which is provided to the gateway server of the transmission management center. The computer of the printed matter preparer is connected to the gateway server of the transmission management center via an internet. The gateway server of the transmission management center is connected to the printing apparatus and the computer of the printed matter customer via the internet. The printing information prepared by the computer of the printed matter preparer is stored in the memory storing means of the gateway server via the internet. In the printing system, when the computer of the printed matter customer designates an IP address allocated to the self computer and issues a command for outputting the printing information via the internet to the gateway server, the gateway server issues a command for outputting the printing information stored in the memory storing means to the printing apparatus of the printed matter customer, which has the allocated IP address, via the internet.

According to the printing system of the fifth aspect of the invention, the printing information prepared by the computer of the printed matter preparer can be stored in the memory storing means of the gateway server, via the internet, by operating the computer of the printed matter preparer. By designating the IP address that has been allocated to the computer of the printed matter customer, and issuing a command for outputting the printing information to the gateway server via the internet, through operating the computer of the printed matter customer, the printing information that is stored in the memory storing means of the gateway server can be output via the internet from the printing apparatus of the printed matter customer after location information for the printing apparatus is determined by identifying the IP address of the computer of the printed matter customer. Therefore, by providing the same conditions to the printing apparatus of the printed matter customer as those existing in a printing apparatus of the printed matter preparer, the printing information output obtained from the printing apparatus of the printed matter customer can be the same as a printed matter sample, or a completed printed matter, which is obtained by printing the printing information prepared by the computer of the printed matter preparer on the printing apparatus of the printed matter preparer.

A printing system according to a sixth aspect of the present invention, in the third aspect of the invention, includes: a computer having an allocated IP address, which is provided to the printed matter customer; and a memory storing means for storing the printing information prepared by the computer of the printed matter preparer, which is provided to the gateway server of the transmission management center. The computer of the printed matter customer is connected to the computer of the transmission management center via the internet. The gateway server of the transmission management center is connected to the printing apparatus and the computer of the printed matter customer via the internet. The printing information prepared by the computer of the printed matter preparer is stored in the memory storing means of the gateway server via the internet and the computer of the transmission management center. In the printing system, when the computer of the printed matter customer designates an IP address allocated to the self computer and issues a command for outputting the printing information via the internet to the gateway server, the gateway server issues a command for outputting the printing information stored in the memory storing means to the printing apparatus of the printed matter customer, which has the allocated IP address, via the internet.

According to the printing system of the sixth aspect of the invention, the printing information prepared by the computer of the printed matter preparer can be stored in the memory storing means of the gateway server, via the internet and the computer of the transmission management center, by operating the computer of the printed matter preparer. By designating the IP address that has been allocated to the computer of the printed matter customer, and issuing a command for outputting the printing information to the gateway server via the internet, through operating the computer of the printed matter customer, the printing information that is stored in the memory storing means of the gateway server can be output via the internet from the printing apparatus of the printed matter customer after location information for the printing apparatus is determined by identifying the IP address of the computer of the printed matter customer. Therefore, by providing the same conditions to the printing apparatus of the printed matter customer as those existing in a printing apparatus of the printed matter preparer, the printing information output obtained from the printing apparatus of the printed matter customer can be the same as a printed matter sample, or a completed printed matter, which is obtained by printing the printing information prepared by the computer of the printed matter preparer on the printing apparatus of the printed matter preparer.

A printing method according to a seventh aspect of the present invention includes: providing a computer for preparing printing information and a gateway server connected to the computer to a printed matter preparer; providing a printing apparatus having an allocated IP address to a printed matter customer; and connecting the gateway server of the printed matter preparer to the printing apparatus of the printed matter customer via an internet. In the printing method, when the computer of the printed matter preparer designates the IP address allocated to the printing apparatus of the printed matter customer and issues a command for outputting the printing information, the gateway server, in place of the computer of the printed matter preparer, issues a command for outputting the printing information via the internet to the printing apparatus of the printed matter customer, which has the allocated IP address.

A printing method according to an eighth aspect of the present invention includes: providing a computer for preparing printing information to a printed matter preparer; providing a printing apparatus having an allocated IP address to a printed matter customer; and connecting the computer of the printed matter preparer and the printing apparatus to a gateway server provided to a transmission management center via an internet. In the printing method, when the computer of the printed matter preparer designates the IP address allocated to the printing apparatus of the printed matter customer and issues a command for outputting the printing information via the internet, the gateway server, in place of the computer of the printed matter preparer, issues a command for outputting the printing information via the internet to the printing apparatus of the printed matter customer, which has the allocated IP address.

A printing method according to a ninth aspect of the present invention includes: providing a computer for preparing printing information, to a printed matter preparer; providing a printing apparatus having an allocated IP address to a printed matter customer; providing a computer and a gateway server connected to the computer to a transmission management center connecting the computer of the printing matter preparer to the computer of the transmission management center via an internet, connecting the gateway server of the transmission management center to the printing apparatus of the printed matter customer via the internet. In the printing method, when the IP address allocated to the printing apparatus of the printed matter customer is designated by the computer of the printed matter preparer via the internet, and the printing information is transmitted to the computer of the transmission management center, the computer of the transmission management center issues a command for outputting the printing information, and the gateway server, after receiving the command for outputting the printing information, issues a command for outputting the printing information via the internet to the printing apparatus of the printed matter customer, which has the allocated IP address.

A printing method according to a tenth aspect of the present invention, in the seventh aspect of the invention, includes: providing a memory storing means for storing printing information prepared by the computer of the printed matter preparer to the gateway server; providing a computer having an allocated IP address to the printed matter customer; and connecting the gateway server of the printed matter preparer to the printing apparatus and the computer of the printed matter customer via an internet. In the printing method, when the computer of the printed matter customer designates an IP address allocated to the self computer and issues a command for outputting the printing information via the internet to the gateway server, the gateway server issues a command for outputting the printing information stored in the memory storing means to the printing apparatus of the printed matter customer, which has the allocated IP address, via the internet.

A printing method according to an eleventh aspect of the present invention, in the eighth aspect of the invention, includes: providing a computer having an allocated IP address to the printer matter customer; providing a memory storing means for storing printing information prepared by the computer of the printed matter preparer to the gateway server of the transmission management center; connecting the computer of the printed matter preparer to the gateway server of the transmission management center via an internet; connecting the gateway server of the transmission management center to the printing apparatus and the computer of the printed matter customer via the internet, storing the printing information prepared by the computer of the printed matter preparer in the memory storing means of the gateway server via the internet. In the printing method, when the computer of the printed matter customer designates an IP address allocated to the self computer and issues a command for outputting the printing information via the internet to the gateway server, the gateway server issues a command for outputting the printing information stored in the memory storing means to the printing apparatus of the printed matter customer, which has the allocated IP address, via the internet.

A printing method according to a twelfth aspect of the present invention, in the ninth aspect of the invention, includes: providing a computer having an allocated IP address to the printed matter customer; providing a memory storing means for storing the printing information prepared by the computer of the printed matter preparer to the gateway server of the transmission management center; connecting the computer of the printed matter customer to the computer of the transmission management center via the internet; connecting the gateway server of the transmission management center to the printing apparatus and the computer of the printed matter customer via the internet; and storing the printing information prepared by the computer of the printed matter preparer in the memory storing means of the gateway server via the internet and the computer of the transmission management center. In the printing method, when the computer of the printed matter customer designates an IP address allocated to the self computer and issues a command for outputting the printing information via the internet to the gateway server, the gateway server issues a command for outputting the printing information stored in the memory storing means to the printing apparatus of the printed matter customer, which has the allocated IP address, via the internet.

According to a printing system and method of the present invention as described above, by operating the computer of the printed matter preparer to cause the gateway server to operate, the printing information prepared by the computer of the printed matter preparer can be output via the internet from the printing apparatus of the printed matter customer, after location information for the printing apparatus is determined by identifying the IP address of the printing apparatus. Therefore, by providing the same conditions to the printing apparatus of the printed matter customer as those existing in a printing apparatus of the printed matter preparer, the printing information output obtained from the printing apparatus of the printed matter customer can be the same as a printed matter sample, or a completed printed matter, which is obtained by printing the printing information prepared by the computer of the printed matter preparer on the printing apparatus of the printed matter preparer. The time and effort required for the printed matter customer and the printed matter preparer to meet with each other, or send the printed matter and the like through the mail, in order to verify the printed matter sample or deliver the completed printed matter, can thus be eliminated. Verification of the printed matter sample up through delivery of the completed printed matter can be performed simply and in a short period of time.

Further, the operations for outputting the printing information from the printing apparatus of the printed matter customer can be performed by the printed matter preparer operating the computer of the printed matter preparer, and therefore it is not necessary for the printed matter customer to perform computer operations. Accordingly, there is no need for a skilled computer operator, and further, all that the printed matter customer needs is the printing apparatus and a connection to the internet. The burden of equipment investment can therefore be reduced.

In addition, the printed matter can immediately be printed from the printing apparatus of the printed matter customer through the operation of the computer performed by the printed matter preparer according to an order from the printed matter customer, provided that the printing information is stored in the computer of the printed matter preparer. It therefore becomes possible, for example, to promptly obtain a necessary amount of business cards, catalogs, or the like, when required. Waste that accompanies ordering an estimated amount can be completely eliminated.

Further, in accordance with a printing system and method of the present invention, the printing information prepared by the computer of the printed matter preparer can be stored in the memory storing means of the gateway server. By designating the IP address that has been allocated to the computer of the printed matter customer, and issuing a command for outputting the printing information to the gateway server via the internet, through operating the computer of the printed matter customer, the printing information that is stored in the memory storing means of the gateway server can be output via the internet from the printing apparatus of the printed matter customer after location information for the printing apparatus is determined by identifying the IP address of the computer of the printed matter customer. Therefore, by providing the same conditions to the printing apparatus of the printed matter customer as those existing in a printing apparatus of the printed matter preparer, the printing information output obtained from the printing apparatus of the printed matter customer can be the same as a printed matter sample, or a completed printed matter, which is obtained by printing the printing information prepared by the computer of the printed matter preparer on the printing apparatus of the printed matter preparer. The time and effort required for the printed matter customer and the printed matter preparer to meet with each other, or send the printed matter and the like through the mail, in order to verify the printed matter sample or deliver the completed printed matter, can thus be eliminated. Verification of the printed matter sample up through delivery of the completed printed matter can be performed simply and in a short period of time.

Further, the operation for outputting the printing information from the printing apparatus of the printed matter customer is performed by the printed matter customer operating the computer of the printed matter customer, and therefore there is no burden placed on the printed matter preparer. The reduced burden can achieve a cost reduction in the printed matter preparation.

Furthermore, there is no need to provide programs required for preparing the printed matter to the computer of the printed matter customer. There is also no need for a person skilled in printed matter preparation.

In addition, the printing information is stored in the memory storing means of the gateway server. The printing information can therefore be output from the printing apparatus of the printed matter customer by operating the computer of the printed matter customer at a timing that is convenient for the printed matter customer. For example, it becomes possible to promptly obtain the necessary amount of business cards, catalogs, or the like, when required. Waste that accompanies ordering an estimated amount can be completely eliminated.

DETAILED DESCRIPTION OF THE PREFERRED EMBODIMENTS

A description will herein after be made of embodiments of a printing system according to the present invention.

Figure 1:
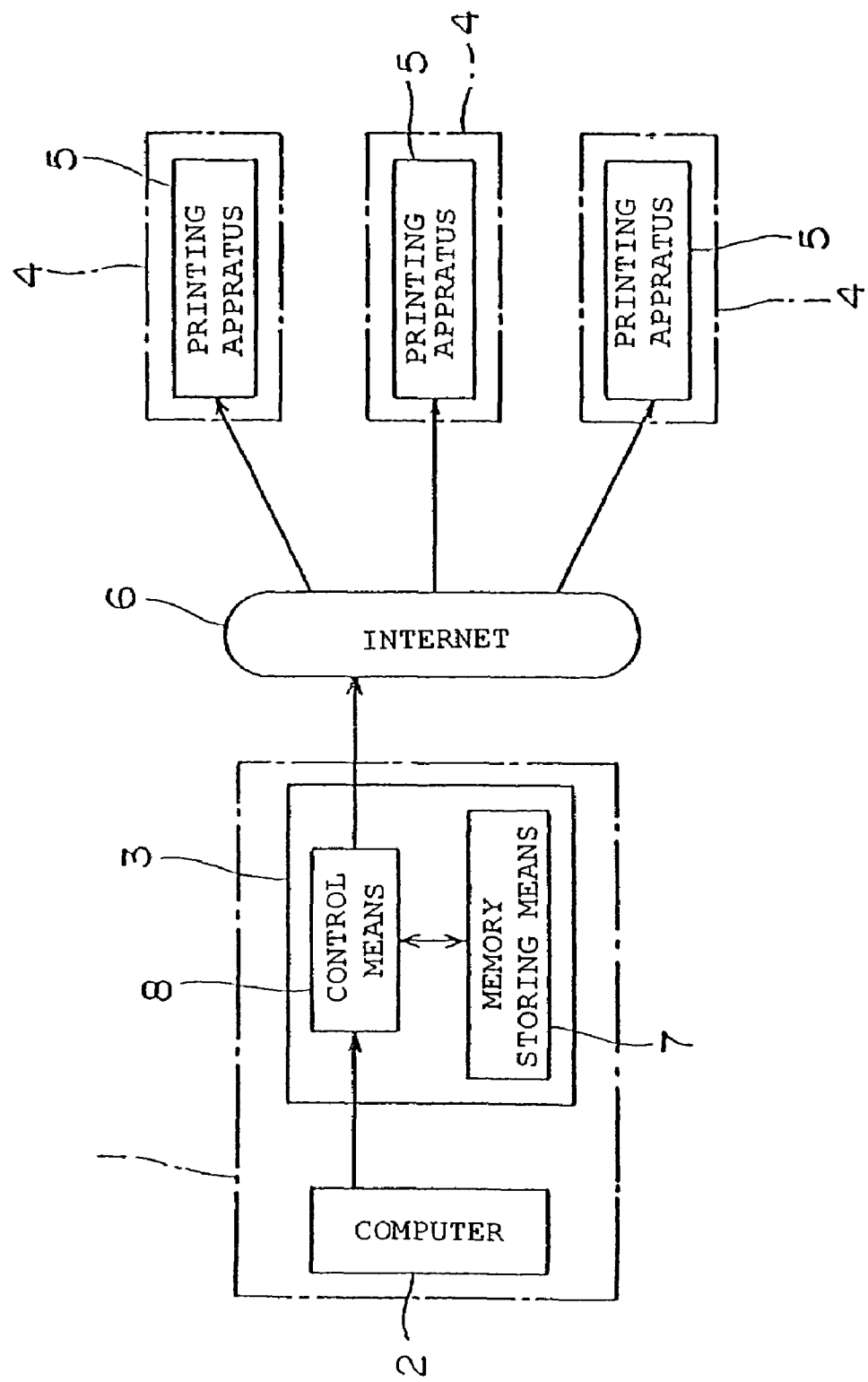
FIG. 1 is a block diagram showing a first embodiment of a printing system according to the present invention.

FIG. 1 is a block diagram showing a first embodiment of a printing system according to the present invention. Reference numeral 1 in FIG. 1 denotes a printed matter preparer who receives a request to prepare a printed matter, reference numeral 2 denotes a computer provided to the printed matter preparer and having a function for preparing printing information, and reference numeral 3 denotes a gateway server similarly provided to the printed matter preparer and connected to the computer 2. Reference numeral 4 denotes a printed matter customer who requests the preparation of a printed matter, and reference numeral 5 denotes a printing apparatus that is provided to the printed matter customer 4. An IP address is allocated to the printing apparatus 5. The gateway server 3 that is provided to the printed matter preparer 1 and the printing apparatus 5 that is provided to the printed matter customer 4 are connected via an internet 6 through a telephone line.

The gateway server 3 that is provided to the printed matter preparer 1 has structure which includes a memory storing means 7 that stores printing information prepared by the computer 2, which is provided to the printed matter preparer 1, and a control means 8. The control means 8 is programmed to store the printing information in the memory storing means 7 when the computer 2 of the printed matter preparer 1 designates a specific IP address and issues a command for outputting the printing information. The control means is also programmed to issue a command for outputting the printing information stored in the memory storing means 7 to the printing apparatus 5, which has the allocated IP address that is designated by the computer 2.

Further, the same printing conditions, such as the same toner conditions and paper conditions, are given to the printing apparatus 5, which is provided to the printed matter customer 4, as those found in a printing apparatus of the printed matter preparer 1. The printed matter obtained from the printing apparatus 5 is thus the same as that obtained from the printing apparatus of the printed matter preparer 1.

Printing by this type of printing system is implemented as follows.

First, the printed matter customer 4 requests the preparation of a printed matter from the printed matter preparer 1. There are no specific limitations placed on the means for requesting that the printed matter be prepared. Facsimile, telephone, letter, and other means may be employed.

If there is a request for printed matter preparation from the printed matter customer 4, the printed matter preparer 1 designs the printed matter by using the computer 2 of the printed matter preparer 1. After the designing of the printed matter is completed, the printed matter preparer 1, through operating the computer 2, designates the IP address of the printing apparatus of the printed matter customer 4, and issues a command for outputting the printing information to be used by the printed matter customer 4a in verifying a sample of the printed matter.

The printing information is stored in the memory storing means 7 of the gateway server 3 connected to the computer 2 when the computer 2 of the printed matter preparer 1 is operated, the IP address of the printing apparatus of the printed matter customer 4 is designated, and a command for outputting the printing information is issued. The printing information stored in the memory storing means 7 of the gateway server 3 is output from the printing apparatus 5 of the printed matter customer 4 after location information for the printing apparatus is determined by identifying the IP address of the printing apparatus, which is designated by the computer 2, via the internet 6.

The printed matter customer 4 can thus obtain a sample of the requested printed matter from the printing apparatus 5, and can verify the sample. When there is a disparity between the sample and the image that the printed matter customer 4 has in mind, the printed matter customer 4 can request corrections or changes to the design from the printed matter preparer 1 by telephone, facsimile, or other means. The printed matter preparer 1 outputs the corrected or changed design from the printing apparatus 5 of the printed matter customer 4 by the above-mentioned procedure, and requests verification by the printed matter customer 4.

When the printed matter customer 4 is satisfied with the sample, the printed matter customer 4 transmits a request for delivery of the printed matter, and the necessary number of copies, by telephone, facsimile, or other means.

The printed matter preparer 1 receives the transmission from the printed matter customer 4, and outputs the printing information from the printing apparatus 5 of the printed matter customer 4 by the above-mentioned procedure. The printed matter thus output is delivered as a completed printed matter.

The time and effort required for the printed matter customer 4 and the printed matter preparer 1 to meet with each other, or send the printed matter and the like through the mail, in order to verify the printed matter sample or deliver the completed printed matter, can thus be eliminated. Verification of the printed matter sample up through delivery of the completed printed matter can be performed simply and in a short period of time.

Further, the operations for outputting the printing information from the printing apparatus 5 of the printed matter customer 4 can be performed by the printed matter preparer 1 operating the computer 2, and therefore it is not necessary for the printed matter customer 4 to perform computer operations. Accordingly, there is no need for a skilled computer operator, and further, all that the printed matter customer 4 needs is the printing apparatus 5 and a connection to the internet 6. The burden of equipment investment can therefore be reduced.

In addition, the printed matter can immediately be printed from the printing apparatus 5 of the printed matter customer 4 through the operation of the computer 2 performed by the printed matter preparer 1 according to an order from the printed matter customer 4, provided that the printing information is stored in the computer 2 of the printed matter preparer 1. It therefore becomes possible, for example, to promptly obtain a necessary amount of business cards, catalogs, or the like, when required. Waste that accompanies ordering an estimated amount can be completely eliminated.

Note that the printed matter customer 4 may of course also be an intermediary for the printed matter order, not only the end-user who requests the printed matter.

Figure 2:
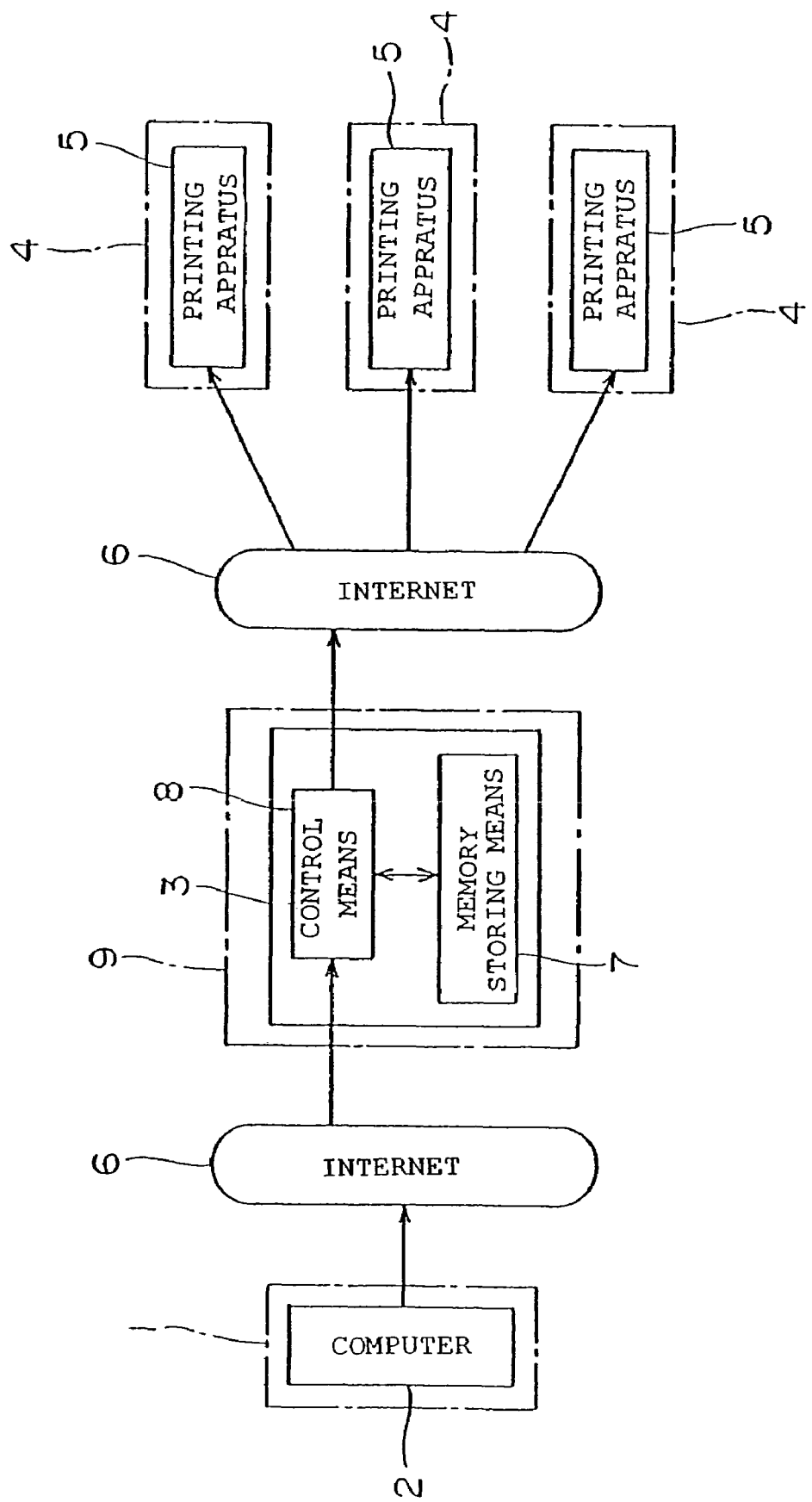
FIG. 2 is a block diagram showing a second embodiment of a printing system according to the present invention.

FIG. 2 is a block diagram showing a second embodiment of a printing system according to the present invention. The same reference numerals as those used in FIG. 1, which shows the first embodiment, are used in FIG. 2 for structures common to both embodiments. Explanations of the common structures are omitted.

In this embodiment, the gateway server 3 is provided to a transmission management center 9, the computer 2 for preparing the printed matter is provided to the printed matter preparer 1, and the printing apparatus 5 having the allocated IP address is provided to the printed matter customer 4. The computer 2 that is provided to the printed matter preparer 1, and the printing apparatus 5 that is provided to the printed matter customer 4, are connected to the gateway server 3 provided to the transmission management center 9 via the internet 6 through a telephone line.

The gateway server 3 provided to the transmission management center 9 has a structure which includes a memory storing means 7 for storing printing information prepared by the computer 2 of the printed matter preparer 1, and a control means 8. The control means 8 is programmed to store the printing information in the memory storing means 7 when the IP address allocated to the printing apparatus of the printed matter customer 4 is designated by the computer 2 of the printed matter preparer 1 via the internet 6, and a command for outputting the printing information is sent to the gateway server 3. In addition, the control means 8 is programmed to issue the command for outputting the printing information, which is stored in the memory storing means 7, to the printing apparatus 5, which has the allocated IP address designated by the computer 2.

Printing by this type of printing system is implemented as follows.

First, the printed matter customer 4 requests the preparation of the printed matter from the printed matter preparer 1. There are no specific limitations placed on the means for requesting that the printed matter be prepared. Facsimile, telephone, letter, and other means may be employed.

If there is a request for a printed matter preparation from the printed matter customer 4, the printed matter preparer 1 designs the printed matter by using the computer 2 of the printed matter preparer 1. After the designing of the printed matter is completed, the printed matter preparer 1, through operating the computer 2, designates the IP address of the printing apparatus of the printed matter customer 4, and sends a command for outputting the printing information to the gateway server 3 of the transmission management center 9 via the internet 6 to be used by the printed matter customer 4a in verifying a sample of the printed matter.

When a command for outputting the printing information is sent from the computer 2 of the printed matter preparer 1 to the gateway server 3 of the transmission management center 9, the printing information is stored in the memory storing means 7 of the gateway server 3. In addition, the printing information stored in the memory storing means 7 of the gateway server 3 is output from the printing apparatus 5 of the printed matter customer 4 after location information for the printing apparatus 5 is determined by identifying the IP address of the printing apparatus, which is designated by the computer 2, via the internet 6.

The printed matter customer 4 can thus obtain a sample of the requested printed matter from the printing apparatus 5, and can verify the sample. When there is a disparity between the sample and the image that the printed matter customer 4 has in mind, the printed matter customer 4 can request corrections or changes to the design from the printed matter preparer 1 by telephone, facsimile, or other means. The printed matter preparer 1 outputs the corrected or changed design from the printing apparatus 5 of the printed matter customer 4 by the above-mentioned procedure, and requests verification by the printed matter customer 4.

When the printed matter customer 4 is satisfied with the sample, the printed matter customer 4 transmits a request for delivery of the printed matter, and the necessary number of copies, by telephone, facsimile, or other means. The printed matter preparer 1 receives the transmission from the printed matter customer 4, and outputs the printing information from the printing apparatus 5 of the printed matter customer 4 by the above-mentioned procedure. The printed matter thus output is delivered as a completed printed matter.

The time and effort required for the printed matter customer 4 and the printed matter preparer 1 to meet with each other, or send the printed matter and the like through the mail, in order to verify the printed matter sample or deliver the completed printed matter, can thus be eliminated. Verification of the printed matter sample up through delivery of the completed printed matter can be performed simply and in a short period of time.

Further, the operations for outputting the printing information from the printing apparatus 5 of the printed matter customer 4 can be performed by the printed matter preparer 1 operating the computer 2, and therefore it is not necessary for the printed matter customer 4 to perform computer operations. Accordingly, there is no need for a skilled computer operator, and further, all that the printed matter customer 4 needs is the printing apparatus 5 and a connection to the internet 6. The burden of equipment investment can therefore be reduced.

In addition, the printed matter can immediately be printed from the printing apparatus 5 of the printed matter customer 4 through the operation of the computer 2 performed by the printed matter preparer 1 according to an order from the printed matter customer 4, provided that the printing information is stored in the computer 2 of the printed matter preparer 1. It therefore becomes possible, for example, to promptly obtain a necessary amount of business cards, catalogs, or the like, when required. Waste that accompanies ordering an estimated amount can be completely eliminated.

In addition, a plurality of the printed matter preparers 1 can utilize the gateway server 3 of the transmission management center 9, and therefore there is little burden of investing in equipment placed on the printed matter preparers 1.

Figure 3:
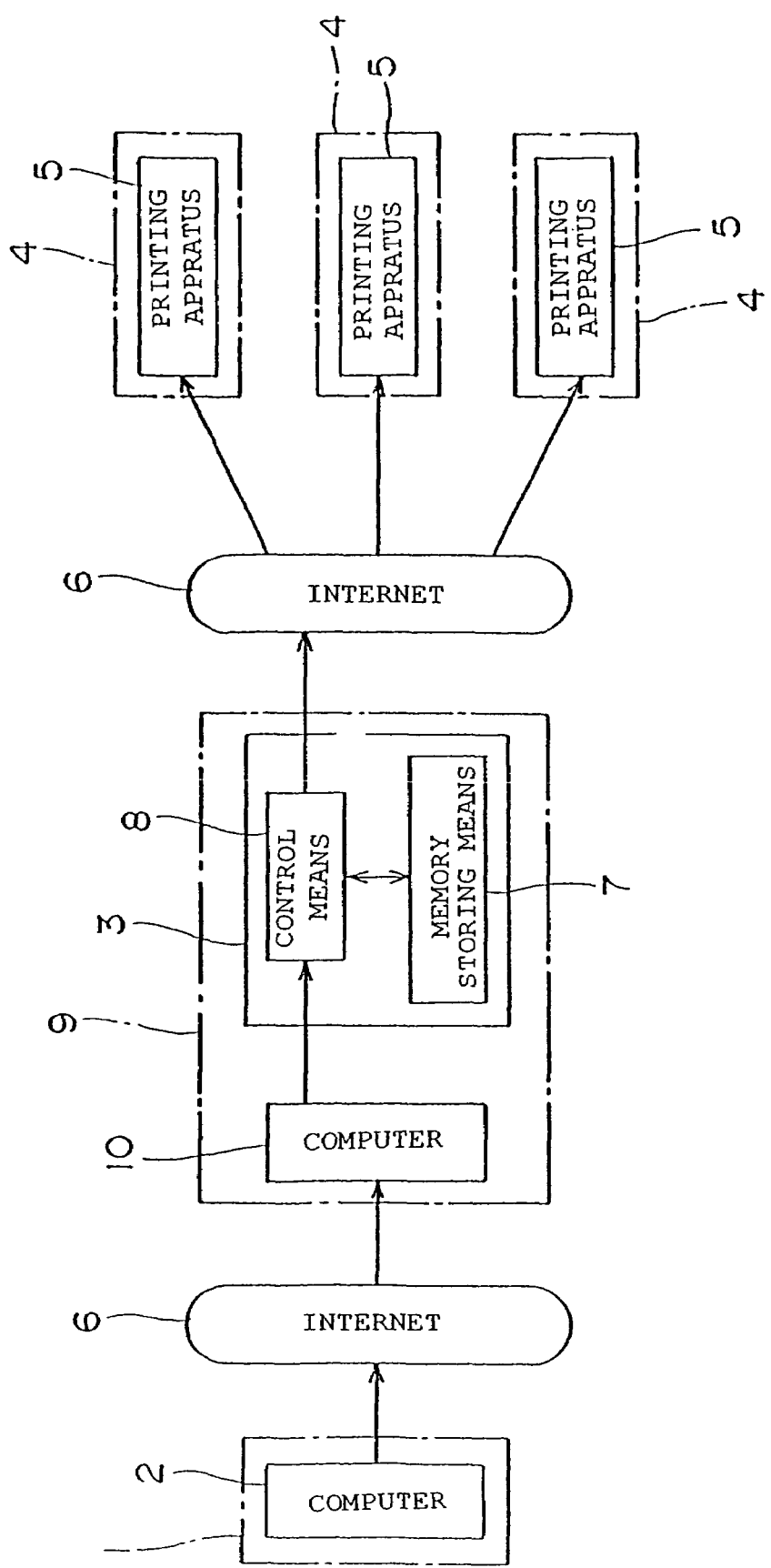
FIG. 3 is a block diagram showing a third embodiment of a printing system according to the present invention.

FIG. 3 is a block diagram showing a third embodiment of a printing system according to the present invention. The same reference numerals as those used in FIG. 1 and FIG. 2, which show the first embodiment and the second embodiment, respectively, are used in FIG. 3 for structures common to the three embodiments. Explanations of the common structures are omitted.

In this embodiment, the gateway server 3 and a computer 10 connected to the gateway server 3 are provided to the transmission management center 9. The computer 2 for preparing the printed matter is provided to the printed matter preparer 1, and the printing apparatus 5 having the allocated IP address is provided to the printed matter customer 4. The computer 2 that is provided to the printed matter preparer 1 is connected to the computer 10, which is provided to the transmission management center 9, via the internet 6 through a telephone line. The printing apparatus 5 that is provided to the printed matter customer 4 is connected to the gateway server 3, which is provided to the transmission management center 9, via the internet 6 through a telephone line.

The computer 10 provided to the transmission management center 9 is configured to open the printing information and issue a command for outputting the printing information when the IP address allocated to the printing apparatus of the printed matter customer 4 is designated by the computer 2 of the printed matter preparer 1 and a command for outputting the printing information is sent to the computer 10, via the internet 6. An operator of the transmission management center 9 performs operation of the computer 10 at this point. Further, the gateway server 3 has a structure which includes the memory storing means 7 for storing printing information prepared by the computer 2 of the printed matter preparer 1, and the control means 8. The control means 8 is programmed to store the printing information in the memory storing means 7 after receiving a command for outputting the printing information of the computer 10. In addition, the control means 8 is programmed to issue the command for outputting the printing information, which is stored in the memory storing means 7, to the printing apparatus 5, which has the allocated IP address designated by the computer 2 of the printed matter preparer 1.

Printing by this type of printing system is implemented as follows.

First, the printed matter customer 4 requests the preparation of a printed matter from the printed matter preparer 1. There are no specific limitations placed on the means for requesting that the printed matter be prepared. Facsimile, telephone, letter, and other means may be employed.

If there is a request for printed matter preparation from the printed matter customer 4, the printed matter preparer 1 designs the printed matter by using the computer 2 of the printed matter preparer 1. After the designing of the printed matter is completed, the printed matter preparer 1, through operating the computer 2, designates the IP address of the printing apparatus of the printed matter customer 4, and sends a command for outputting the printing information to the computer 10 of the transmission management center 9 via the internet 6 to be used by the printed matter customer 4a in verifying a sample of the printed matter.

When a command for outputting the printing information is sent from the computer 2 of the printed matter preparer 1 to the gateway server 3 of the transmission management center 9, the printing information is opened by the computer 10, and the computer 10 issues a command for outputting the printing information. After the command for outputting the computer 10 issues the printing information, the printing information is stored in the memory storing means 7 of the gateway server 3. In addition, the printing information stored in the memory storing means 7 of the gateway server 3 is output from the printing apparatus 5 of the printed matter customer 4 after location information for the printing apparatus 5 is determined by identifying the IP address of the printing apparatus, which is designated by the computer 2 of the printed matter preparer 1, via the internet 6.

The printed matter customer 4 can thus obtain a sample of the requested printed matter from the printing apparatus 5, and can verify the sample. When there is a disparity between the sample and the image that the printed matter customer 4 has in mind, the printed matter customer 4 can request corrections or changes to the design from the printed matter preparer 1 by telephone, facsimile, or other means. The printed matter preparer 1 outputs the corrected or changed design from the printing apparatus 5 of the printed matter customer 4 by the above-mentioned procedure, and requests verification by the printed matter customer 4.

When the printed matter customer 4 is satisfied with the sample, the printed matter customer 4 transmits a request for delivery of the printed matter, and the necessary number of copies, by telephone, facsimile, or other means. The printed matter preparer 1 receives the transmission from the printed matter customer 4, and outputs the printing information from the printing apparatus 5 of the printed matter customer 4 by the above-mentioned procedure. The printed matter thus output is delivered as a completed printed matter.

The time and effort required for the printed matter customer 4 and the printed matter preparer 1 to meet with each other, or send the printed matter and the like through the mail, in order to verify the printed matter sample or deliver the completed printed matter, can thus be eliminated. Verification of the printed matter sample up through delivery of the completed printed matter can be performed simply and in a short period of time.

Further, with regard to the operations for outputting the printing information from the printing apparatus 5 of the printed matter customer 4, it is not necessary for the printed matter customer 4 to perform computer operations. Accordingly, the printed matter customer 4 does not have to have a skilled computer operator, and further, all that the printed matter customer 4 needs is the printing apparatus 5 and a connection to the internet 6. The burden of equipment investment can therefore be reduced.

In addition, the printed matter can immediately be printed from the printing apparatus 5 of the printed matter customer 4 through the operation of the computer 2 performed by the printed matter preparer 1 according to an order from the printed matter customer 4, provided that the printing information is stored in the computer 2 of the printed matter preparer 1. It therefore becomes possible, for example, to promptly obtain a necessary amount of business cards, catalogs, or the like, when required. Waste that accompanies ordering an estimated amount can be completely eliminated.

In addition, a plurality of the printed matter preparers 1 can utilize the gateway server 3 of the transmission management center 9, and therefore there is little burden of investing in equipment placed on the printed matter preparers 1.

Figure 4:
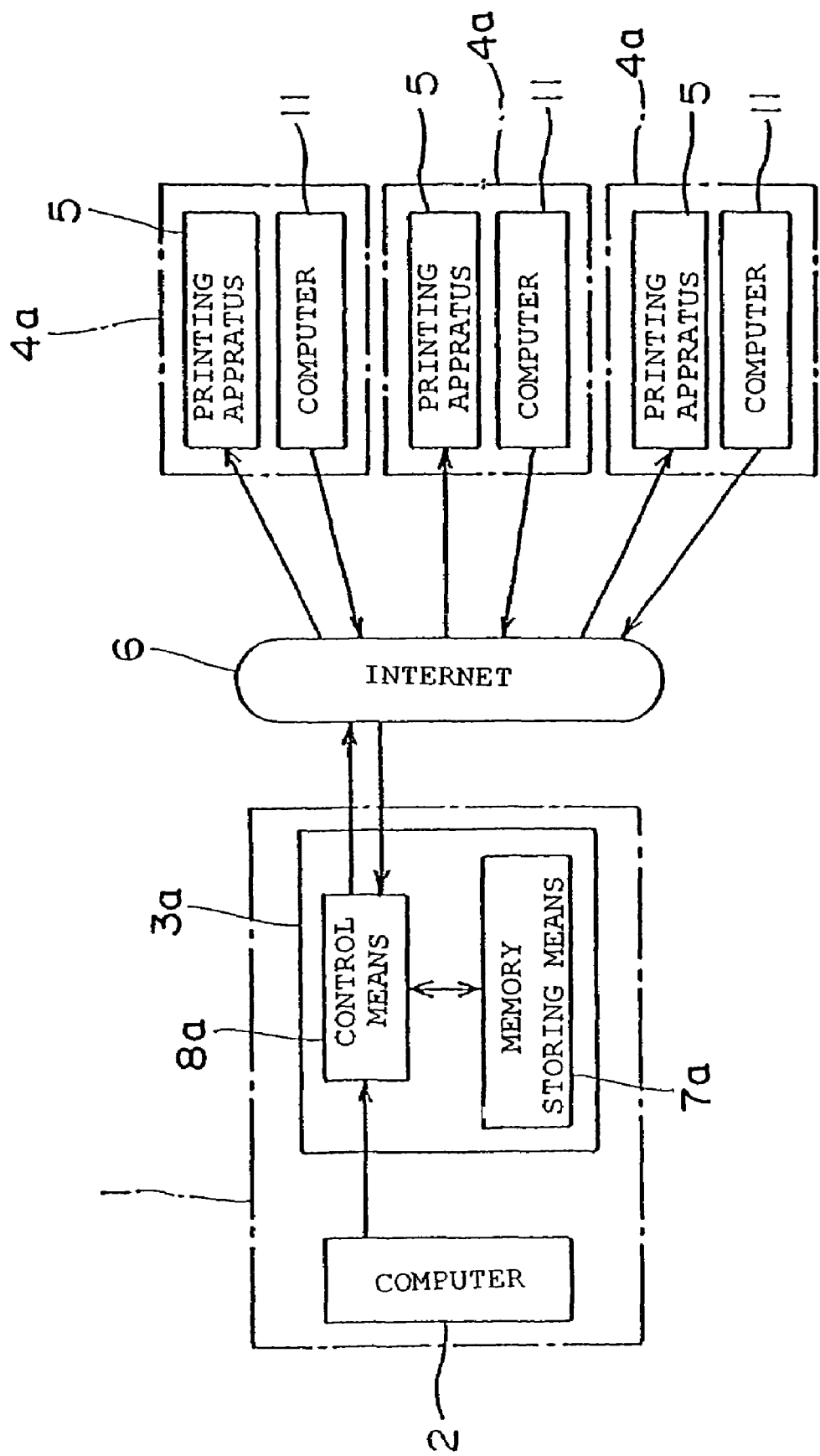
FIG. 4 is a block diagram showing a fourth embodiment of a printing system according to the present invention.

FIG. 4 is a block diagram showing a fourth embodiment of a printing system according to the present invention. The same reference numerals as those used in FIG. 1, which shows the first embodiment, respectively, are used in FIG. 4 for structures common to both embodiments. Explanations of the common structures are omitted.

The basic structure in this embodiment is the same as that of the first embodiment shown in FIG. 1. Differing from the first embodiment are a memory storing means 7a and a control means 8a of a gateway server 3a, and the fact that a computer 11 connected to the gateway server 3a via the internet 6 is provided to a printed matter customer 4a along with the printing apparatus 5.

The memory storing means 7a of the gateway server 3a of this embodiment can store the printing information prepared by the computer 2 even if the computer 2 of the printed matter preparer 1 does not issue a command for outputting the printing information. Further, there is a program incorporated in the control means 8*a*. With this program, when the computer 11 of the printed matter customer 4*a* designates an IP address allocated to the computer of the printed matter customer 4*a* and issues a command for outputting the printing information to the gateway server 3*a* via the internet 6, the gateway server 3*a* issues a command for outputting the printing information, which is stored in the memory storing means 7*a*, to the printing apparatus 5 of the printed matter customer 4*a*, which has the allocated IP address, via the internet 6.

Printing by this type of printing system is implemented as follows.

First, the printed matter customer 4*a* requests the preparation of a printed matter from the printed matter preparer 1. There are no specific limitations placed on the means for requesting that the printed matter be prepared. Facsimile, telephone, letter, and other means may be employed.

If there is a request for printed matter preparation from the printed matter customer 4*a*, the printed matter preparer 1 designs the printed matter by using the computer 2 of the printed matter preparer 1. After the designing of the printed matter is completed, the printed matter preparer 1, through operating the computer 2, designates the IP address of the computer of the printed matter customer 4*a*, and stores the printing information in the memory storing means 7*a* of the gateway server 3*a* to be used by the printed matter customer 4*a* in verifying a sample of the printed matter.

On the other hand, the printed matter customer 4*a*, through operating the computer 11, designates the IP address allocated to the computer of the printed matter customer 4*a*, and sends a command for outputting the printing information to the gateway server 3*a* via the internet 6. When the command for outputting the printing information is sent to the gateway server 3*a* from the computer 11 of the printed matter customer 4*a*, the gateway server 3*a* outputs the printing information stored in the memory storing means 7*a* from the printing apparatus 5 of the printed matter customer 4*a* after determining location information for the printing apparatus 5 by identifying the IP address of the printing apparatus, via the internet 6.

The printed matter customer 4*a* can thus obtain the sample of the requested printed matter from the printing apparatus 5, and can verify the sample. The printed matter customer 4*a* then requests corrections or changes to the design from the printed matter preparer 1 by telephone, facsimile, or other means when there is a disparity between the sample and what the printed matter customer 4*a* has in mind. The printed matter preparer 1 then stores the printing information having design corrections or changes in the memory storing means 7*a* of the gateway server 3*a* by the above-mentioned procedure. The printed matter customer 4*a* then operates the computer 11 as described above, and can output the corrected or changed printing information from the printing apparatus 5, and verify the sample.

When the printed matter customer 4*a* is satisfied with the sample, the printed matter customer 4*a* operates the computer 11 and outputs the printing information from the printing apparatus 5 of the printed matter customer 4*a*. The output printed matter is thus delivered as a completed printed matter.

The time and effort required for the printed matter customer 4*a* and the printed matter preparer 1 to meet with each other, or send the printed matter and the like through the mail, in order to verify the printed matter sample or deliver the completed printed matter, can thus be eliminated. Verification of the printed matter sample up through delivery of the completed printed matter can be performed simply and in a short period of time.

Further, the operation for outputting the printing information from the printing apparatus 5 of the printed matter customer 4*a* is performed by the printed matter customer 4*a* operating the computer 11 of the printed matter customer, and therefore there is no burden placed on the printed matter preparer. The reduced burden can achieve a cost reduction in the printed matter preparation.

Furthermore, there is no need to provide programs required for preparing the printed matter to the computer 11 of the printed matter customer 4*a*. There is also no need for a person skilled in printed matter preparation.

In addition, the printing information is stored in the memory storing means 7*a* of the gateway server 3*a*. The printing information can therefore be output from the printing apparatus 5 of the printed matter customer 4*a* by operating the computer 11 of the printed matter customer 4*a* at a timing that is convenient for the printed matter customer 4*a*. For example, it becomes possible to promptly obtain the necessary amount of business cards, catalogs, or the like, when required. Waste that accompanies ordering an estimated amount can be completely eliminated.

Note that the printed matter customer 4*a* may of course also be an intermediary for the printed matter order, not only the end-user who requests the printed matter.

Figure 5:
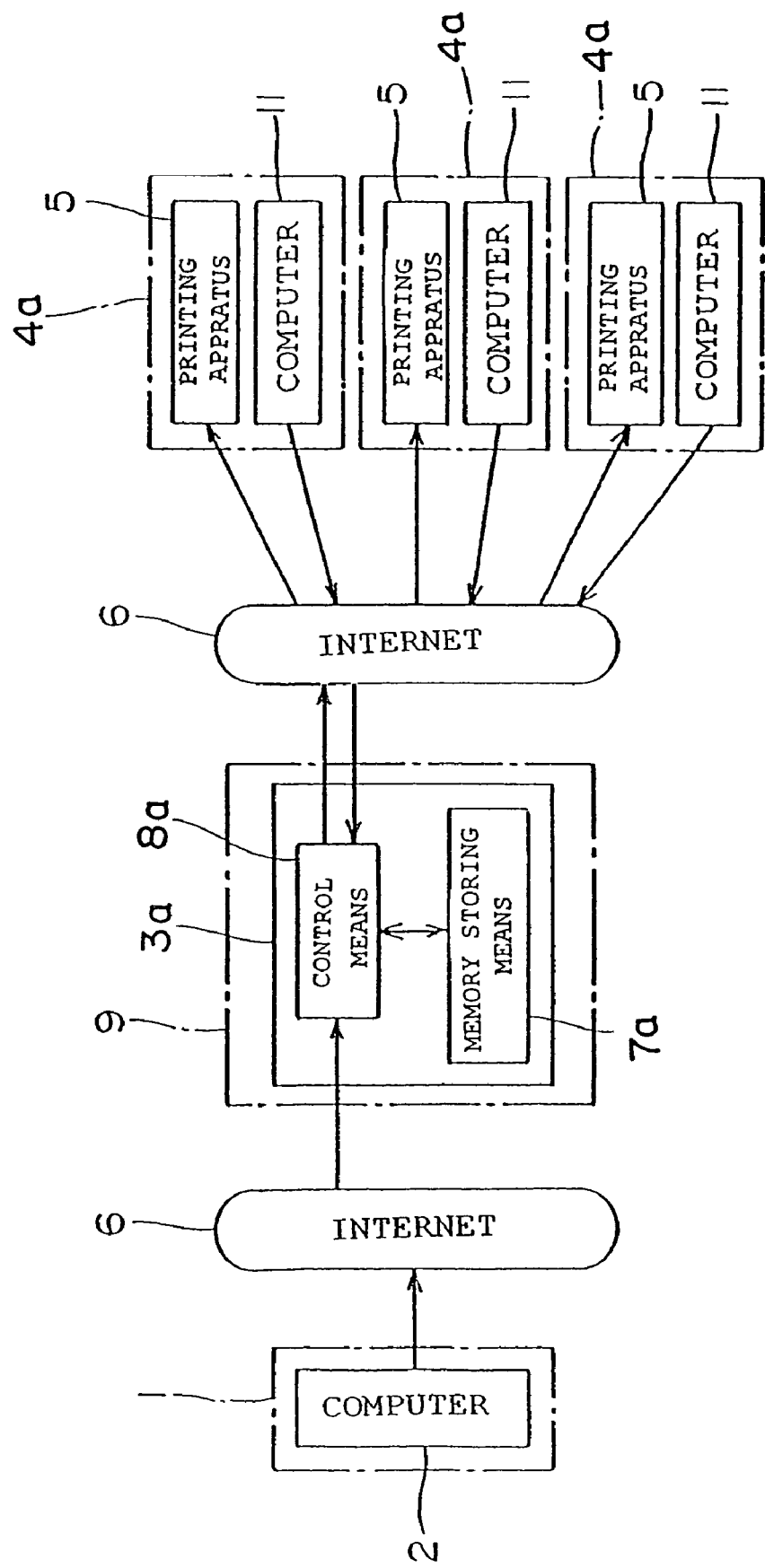
FIG. 5 is a block diagram showing a fifth embodiment of a printing system according to the present invention.

FIG. 5 is a block diagram showing a fifth embodiment of a printing system according to the present invention. The same reference numerals as those used in FIG. 2 and FIG. 4, which show the second embodiment and the fourth embodiment, respectively, are used in FIG. 5 for structures common to the three embodiments. Explanations of the common structures are omitted.

The basic structure in this embodiment is the same as that of the second embodiment shown in FIG. 2. Differing from the second embodiment are a memory storing means 7*a* and a control means 8*a* of a gateway computer 3*a*, and the fact that a computer 11 connected to the gateway server 3*a* via the internet 6 is provided to a printed matter customer 4*a* along with the printing apparatus 5.

The memory storing means 7*a* of the gateway server 3*a* of this embodiment can store the printing information prepared by the computer 2 even if the computer 2 of the printed matter preparer 1 does not issue a command for outputting the printing information. Further, similarly to the fourth embodiment, there is a program incorporated in the control means 8*a*. With this program, when the computer 11 of the printed matter customer 4*a* designates an IP address allocated to the computer of the printed matter customer 4*a* and issues a command for outputting the printing information to the gateway server 3*a* via the internet 6, the gateway server 3*a* issues a command for outputting the printing information, which is stored in the memory storing means 7*a*, to the printing apparatus 5 of the printed matter customer 4*a*, which has the allocated IP address, via the internet 6.

Printing by this type of printing system is implemented as follows.

First, the printed matter customer 4*a* requests the preparation of a printed matter from the printed matter preparer 1. There are no specific limitations placed on the means for requesting that the printed matter be prepared. Facsimile, telephone, letter, and other means may be employed.

If there is a request for a printed matter preparation from the printed matter customer 4*a*, the printed matter preparer 1 designs the printed matter by using the computer 2 of the printed matter preparer 1. After the designing of the printed matter is completed, the printed matter preparer 1, through operating the computer 2, designates the IP address of the computer of the printed matter customer 4a, and stores the printing information in the memory storing means 7a of the gateway server 3a of the transmission management center 9 via the internet 6 to be used by the printed matter customer 4a in verifying a sample of the printed matter.

On the other hand, the printed matter customer 4a, through operating the computer 11, designates the IP address allocated to the computer of the printed matter customer 4a, and sends a command for outputting the printing information to the gateway server 3a via the internet 6. When the command for outputting the printing information is sent to the gateway server 3a from the computer 11 of the printed matter customer 4a, the gateway server 3a outputs the printing information stored in the memory storing means 7a from the printing apparatus 5 of the printed matter customer 4a after determining location information for the printing apparatus 5 by identifying the IP address of the printing apparatus, via the internet 6.

The printed matter customer 4a can thus obtain the sample of the requested printed matter from the printing apparatus 5, and can verify the sample. The printed matter customer 4a then requests corrections or changes to the design from the printed matter preparer 1 by telephone, facsimile, or other means when there is a disparity between the sample and what the printed matter customer 4a has in mind. The printed matter preparer 1 then stores the printing information having design corrections or changes in the memory storing means 7a of the gateway server 3a by the above-mentioned procedure. The printed matter customer 4a then operates the computer 11 as described above, and can output the corrected or changed printing information from the printing apparatus 5, and verify the sample.

When the printed matter customer 4a is satisfied with the sample, the printed matter customer 4a operates the computer 11 and outputs the printing information from the printing apparatus 5 of the printed matter customer 4a. The output printed matter is thus delivered as a completed printed matter.

The time and effort required for the printed matter customer 4a and the printed matter preparer 1 to meet with each other, or send the printed matter and the like through the mail, in order to verify the printed matter sample or deliver the completed printed matter, can thus be eliminated. Verification of the printed matter sample up through delivery of the completed printed matter can be performed simply and in a short period of time.

Further, the operation for outputting the printing information from the printing apparatus 5 of the printed matter customer 4a is performed by the printed matter customer 4a operating the computer 11 of the printed matter customer, and therefore there is no burden placed on the printed matter preparer. The reduced burden can achieve a cost reduction in the printed matter preparation.

Furthermore, there is no need to provide programs required for preparing the printed matter to the computer 11 of the printed matter customer 4a. There is also no need for a person skilled in printed matter preparation.

In addition, the printing information is stored in the memory storing means 7a of the gateway server 3a. The printing information can therefore be output from the printing apparatus 5 of the printed matter customer 4a by operating the computer 11 of the printed matter customer 4a at a timing that is convenient for the printed matter customer 4a. For example, it becomes possible to promptly obtain the necessary amount of business cards, catalogs, or the like, when required. Waste that accompanies ordering an estimated amount can be completely eliminated.

Note that the printed matter customer 4a may of course also be an intermediary for the printed matter order, not only the end-user who requests the printed matter.

Figure 6:
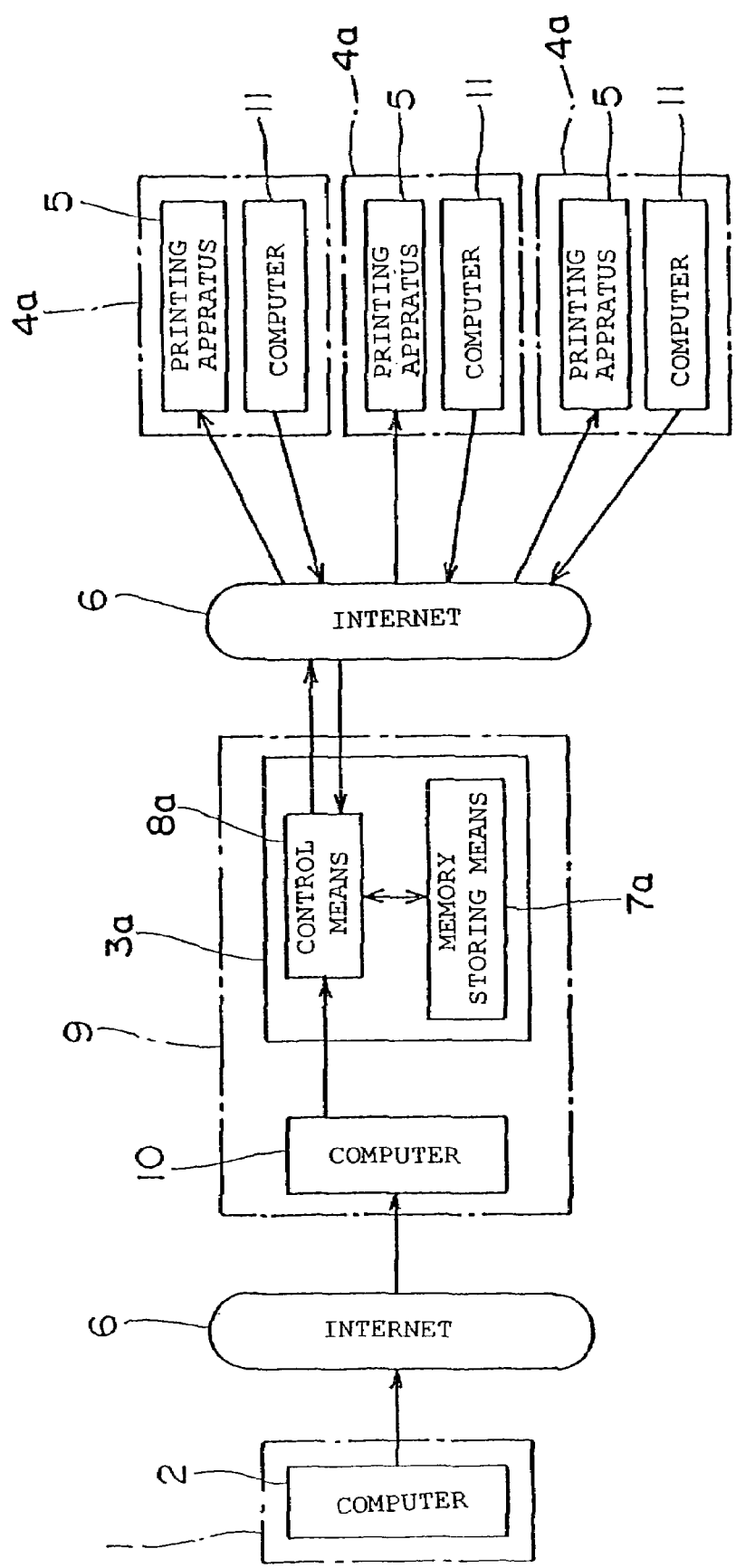
FIG. 6 is a block diagram showing a sixth embodiment of a printing system according to the present invention.

FIG. 6 is a block diagram showing a sixth embodiment of a printing system according to the present invention. The same reference numerals as those used in FIG. 3 and FIG. 4, which show the third embodiment and the fourth embodiment, respectively, are used in FIG. 6 for structures common to the three embodiments. Explanations of the common structures are omitted.

The basic structure in this embodiment is the same as that of the third embodiment shown in FIG. 3. Differing from the third embodiment are a memory storing means 7a and a control means 8a of a gateway computer 3a, and the fact that a computer 11 connected to the gateway server 3a via the internet 6 is provided to a printed matter customer 4a along with the printing apparatus 5.

The memory storing means 7a of the gateway server 3a of this embodiment can store the printing information prepared by the computer 2 even if the computer 2 of the printed matter preparer 1 does not issue a command for outputting the printing information. Further, similarly to the fourth embodiment, there is a program incorporated in the control means 8a. With this program, when the computer 11 of the printed matter customer 4a designates an IP address allocated to the computer of the printed matter customer 4a and issues a command for outputting the printing information to the gateway server 3a via the internet 6, the gateway server 3a issues a command for outputting the printing information, which is stored in the memory storing means 7a, to the printing apparatus 5 of the printed matter customer 4a, which has the allocated IP address, via the internet 6.

Printing by this type of printing system is implemented as follows.

First, the printed matter customer 4a requests the preparation of printed matter from the printed matter preparer 1. There are no specific limitations placed on the means for requesting that the printed matter be prepared. Facsimile, telephone, letter, and other means may be employed.

If there is a request for a printed matter preparation from the printed matter customer 4a, the printed matter preparer 1 designs the printed matter by using the computer 2 of the printed matter preparer 1. After the designing of the printed matter is completed, the printed matter preparer 1, through operating the computer 2, designates the IP address of the computer of the printed matter customer 4a, and stores the printing information in the memory storing means 7a of the gateway server 3a, via the internet 6 and the computer 10 of the transmission management center 9, to be used by the printed matter customer 4a in verifying a sample of the printed matter.

On the other hand, the printed matter customer 4a, through operating the computer 11, designates the IP address allocated to the computer of the printed matter customer 4a, and sends a command for outputting the printing information to the gateway server 3a via the internet 6. When the command for outputting the printing information is sent to the gateway server 3a from the computer 11 of the printed matter customer 4a, the gateway server 3a outputs the printing information stored in the memory storing means 7a from the printing apparatus 5 of the printed matter customer 4a after determining location information for the printing apparatus 5 by identifying the IP address of the printing apparatus, via the internet 6.

The printed matter customer 4a can thus obtain the sample of the requested printed matter from the printing apparatus 5, and can verify the sample. The printed matter customer 4a then requests corrections or changes to the design from the printed matter preparer 1 by telephone, facsimile, or other means when there is a disparity between the sample and what the printed matter customer 4a has in mind. The printed matter preparer 1 then stores the printing information having design corrections or changes in the memory storing means 7a of the gateway server 3a by the above-mentioned procedure. The printed matter customer 4a then operates the computer 11 as described above, and can output the corrected or changed printing information from the printing apparatus 5, and verify the sample.

When the printed matter customer 4a is satisfied with the sample, the printed matter customer 4a operates the computer 11 and outputs the printing information from the printing apparatus 5 of the printed matter customer 4a. The output printed matter is thus delivered as a completed printed matter.

The time and effort required for the printed matter customer 4a and the printed matter preparer 1 to meet with each other, or send the printed matter and the like through the mail, in order to verify the printed matter sample or deliver the completed printed matter, can thus be eliminated. Verification of the printed matter sample up through delivery of the completed printed matter can be performed simply and in a short period of time.

Further, the operation for outputting the printing information from the printing apparatus 5 of the printed matter customer 4a is performed by the printed matter customer 4a operating the computer 11 of the printed matter customer, and therefore there is no burden placed on the printed matter preparer. The reduced burden can achieve a cost reduction in the printed matter preparation.

Furthermore, there is no need to provide programs required for preparing the printed matter to the computer 11 of the printed matter customer 4a. There is also no need for a person skilled in printed matter preparation.

In addition, the printing information is stored in the memory storing means 7a of the gateway server 3a. The printing information can therefore be output from the printing apparatus 5 of the printed matter customer 4a by operating the computer 11 of the printed matter customer 4a at a timing that is convenient for the printed matter customer 4a. For example, it becomes possible to promptly obtain the necessary amount of business cards, catalogs, or the like, when required. Waste that accompanies ordering an estimated amount can be completely eliminated.

Note that the printed matter customer 4a may of course also be an intermediary for the printed matter order, not only the end-user who requests the printed matter.

What is claimed is:

1. A printing system comprising:
   a first computer for preparing printing information;
   a gateway server connected to the first computer, the gateway server having a memory storing means for storing printing information prepared by the first computer, the first computer and the gateway server being provided to a printed matter preparer;
   a second computer having an allocated IP address, the second computer being provided to a printed matter customer; and
   a printing apparatus having an allocated IP address, which is provided to the printed matter customer, the gateway server of the printed matter preparer being connected to the printing apparatus and the second computer of the printed matter customer via an internet,
   wherein, when the first computer of the printed matter preparer designates the IP address allocated to the printing apparatus of the printed matter customer and issues a command for outputting the printing information, the gateway server issues a command for outputting the printing information via the internet to the printing apparatus of the printed matter customer, and
   wherein, when the second computer of the printed matter customer designates the IP address allocated to the second computer and issues a command for outputting the printing information via the internet to the gateway server, the gateway server issues a command for outputting the printing information stored in the memory storing means to the printing apparatus of the printed matter customer via the internet.

2. A printing system comprising:
   a first computer for preparing printing information, which is provided to a printed matter preparer;
   a printing apparatus having an allocated IP address, which is provided to a printed matter customer;
   a second computer having an allocated IP address, the second computer being provided to the printer matter customer; and
   a gateway server having a memory storing means for storing printing information prepared by the first computer of the printed matter preparer, the gateway server being provided to a transmission management center, the gateway server being connected to the first computer, the second computer and the printing apparatus via an internet,
   the printing information prepared by the first computer of the printed matter preparer being stored in the memory storing means of the gateway server via the internet
   wherein, when the first computer of the printed matter preparer designates the IP address allocated to the printing apparatus of the printed matter customer and issues a command for outputting the printing information via the internet, the gateway server issues a command for outputting the printing information via the internet to the printing apparatus of the printed matter customer, and
   wherein, when the second computer of the printed matter customer designates the IP address allocated to the second computer and issues a command for outputting the printing information via the internet to the gateway server, the gateway server issues a command for outputting the printing information stored in the memory storing means to the printing apparatus of the printed matter customer via the internet.

3. A printing system comprising:
   a first computer for preparing printing information, which is provided to a printed matter preparer;
   a printing apparatus having an allocated IP address, which is provided to a printed matter customer;
   a second computer;
   a gateway server having a memory storing means for storing the printing information prepared by the first computer of the printed matter preparer, the second computer and the gateway server being provided to a transmission management center, the second computer and the gateway server being connected to each other; and
   a third computer having an allocated IP address, the third computer being provided to the printed matter customer, the third computer being connected to the second computer via an internet, the first computer of the printed matter preparer being connected to the second computer of the transmission management center via the internet, the gateway server of the transmission management center being connected to the printing apparatus and the third computer of the printed matter customer via the internet, the printing information prepared by the first computer of the printed matter preparer being stored in the memory storing means of the gateway server via the internet and the second computer of the transmission management center, wherein, when the IP address allocated to the printing apparatus of the printed matter customer is designated by the first computer of the printed matter preparer via the internet, and the printing information is transmitted to the second computer of the transmission management center, the second computer of the transmission management center issues a command for outputting the printing information, and the gateway server, after receiving the command for outputting the printing information, issues a command for outputting the printing information via the internet to the printing apparatus of the printed matter customer, and wherein, when the third computer of the printed matter customer designates the IP address allocated to the third computer and issues a command for outputting the printing information via the internet to the gateway server, the gateway server issues a command for outputting the printing information stored in the memory storing means to the printing apparatus of the printed matter customer via the internet.

4. A printing method comprising:

providing a first computer for preparing printing information to a printed matter preparer;

providing a gateway server to the printed matter preparer, the gateway server having a memory storing means for storing printing information prepared by the first computer of the printed matter preparer;

connecting the gateway server to the first computer of the printed matter preparer;

providing a printing apparatus having an allocated IP address to a printed matter customer;

providing a second computer having an allocated IP address to the printed matter customer; and connecting the gateway server of the printed matter preparer to the printing apparatus and the second computer of the printed matter customer via an internet, wherein, when the first computer of the printed matter preparer designates the IP address allocated to the printing apparatus of the printed matter customer and issues a command for outputting the printing information, the gateway server issues a command for outputting the printing information via the internet to the printing apparatus of the printed matter customer, and wherein, when the second computer of the printed matter customer designates the IP address allocated to the second computer and issues a command for outputting the printing information via the internet to the gateway server, the gateway server issues a command for outputting the printing information stored in the memory storing means to the printing apparatus of the printed matter customer via the internet.

5. A printing method comprising:

providing a first computer for preparing printing information to a printed matter preparer;

providing a printing apparatus having an allocated IP address to a printed matter customer;

providing a second computer having an allocated IP address to the printer matter customer;

providing a gateway server to a transmission management center, the gateway server having a memory storing means for storing printing information prepared by the first computer of the printed matter preparer;

connecting the first computer, the second computer and the printing apparatus to the gateway server via an internet; and storing the printing information prepared by the first computer of the printed matter preparer in the memory storing means of the gateway server via the internet, wherein, when the first computer of the printed matter preparer designates the IP address allocated to the printing apparatus of the printed matter customer and issues a command for outputting the printing information via the internet, the gateway server issues a command for outputting the printing information via the internet to the printing apparatus of the printed matter customer, and wherein, when the second computer of the printed matter customer designates the IP address allocated to the second computer and issues a command for outputting the printing information via the internet to the gateway server, the gateway server issues a command for outputting the printing information stored in the memory storing means to the printing apparatus of the printed matter customer.

6. A printing method comprising:

providing a first computer for preparing printing information, to a printed matter preparer;

providing a printing apparatus having an allocated IP address to a printed matter customer;

providing a second computer and a gateway server to a transmission management center, the second computer being connected to the gateway server, the gateway server having a memory storing means for storing the printing information prepared by the first computer of the printed matter preparer;

providing a third computer having an allocated IP address to the printed matter customer;

connecting the first computer of the printing matter preparer to the second computer of the transmission management center via an internet;

connecting the third computer of the printed matter customer to the second computer of the transmission management center via the internet;

connecting the gateway server of the transmission management center to the printing apparatus and the third computer of the printed matter customer via the internet; and storing the printing information prepared by the first computer of the printed matter preparer in the memory storing means of the gateway server via the internet and the second computer of the transmission management center, wherein, when the IP address allocated to the printing apparatus of the printed matter customer is designated by the first computer of the printed matter preparer via the internet, and the printing information is transmitted to the second computer of the transmission management center, the second computer of the transmission management center issues a command for outputting the printing information, and the gateway server, after receiving the command for outputting the printing information, issues a command for outputting the printing information via the internet to the printing apparatus of the printed matter customer, and wherein, when the third computer of the printed matter customer designates the IP address allocated to the third computer and issues a command for outputting the printing information via the internet to the gateway server, the gateway server issues a command for outputting the printing information stored in the memory storing means to the printing apparatus of the printed matter customer via the internet.

* * * * *